US009513402B2

(12) United States Patent
Venkataraman et al.

(10) Patent No.: US 9,513,402 B2
(45) Date of Patent: Dec. 6, 2016

(54) ESTIMATING FRACTURE DIMENSIONS FROM MICROSEISMIC DATA

(75) Inventors: Anupama Venkataraman, Houston, TX (US); Sean D. Every, Houston, TX (US); Bruce M. Kofron, Humble, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 32 days.

(21) Appl. No.: 14/235,413

(22) PCT Filed: Apr. 27, 2012

(86) PCT No.: PCT/US2012/035317
§ 371 (c)(1),
(2), (4) Date: Jan. 27, 2014

(87) PCT Pub. No.: WO2013/028237
PCT Pub. Date: Feb. 28, 2013

(65) Prior Publication Data
US 2014/0188447 A1 Jul. 3, 2014

Related U.S. Application Data

(60) Provisional application No. 61/526,536, filed on Aug. 23, 2011.

(51) Int. Cl.
*G01V 99/00* (2009.01)
*G01V 1/28* (2006.01)

(52) U.S. Cl.
CPC ............. *G01V 99/005* (2013.01); *G01V 1/288* (2013.01); *G01V 2210/1234* (2013.01); *G01V 2210/65* (2013.01)

(58) Field of Classification Search
CPC ....................................................... G01V 1/288
USPC ............................................................ 703/2
See application file for complete search history.

(56) References Cited

U.S. PATENT DOCUMENTS

| 4,969,130 | A | | 11/1990 | Wason et al. |
| 5,377,104 | A | * | 12/1994 | Sorrells et al. ................. 702/11 |
| 5,461,594 | A | | 10/1995 | Mougenot et al. |
| 5,771,170 | A | | 6/1998 | Withers et al. |
| 5,963,508 | A | | 10/1999 | Withers |
| 6,389,361 | B1 | | 5/2002 | Geiser |

(Continued)

OTHER PUBLICATIONS

Abercrombie, R.E. (1995), "Earthquake source scaling relationships from −1 to 5 ML using seismograms recorded at 2.5 km depth," *J. Geophys. Res.* 100, pp. 24015-24036.

(Continued)

*Primary Examiner* — Manuel Rivera Vargas
(74) *Attorney, Agent, or Firm* — ExxonMobil Upstream Research-Law Department

(57) ABSTRACT

Method for imaging of a hydraulic fracture generated by fluid injection. Microseismic data of the hydraulic fracture treatment is collected and analyzed for the location and magnitude of microseismic events. The seismic energy or moment of the micro seismic events is calculated (11) and plotted with the size of events scaled by their energy or moment (12). The cumulative seismic energy or moment is calculated as a function of distance from the perforation point (13). The fracture dimensions are determined by applying cut-offs, based on selected criteria, to the cumulative energy or moment estimates (14).

10 Claims, 2 Drawing Sheets

(56) References Cited

U.S. PATENT DOCUMENTS

| | | |
|---|---|---|
| 6,525,003 B2 | 2/2003 | Schlemmer et al. |
| 6,739,165 B1 | 5/2004 | Strack |
| 6,826,483 B1 | 11/2004 | Anderson et al. |
| 6,876,158 B2 | 4/2005 | Tröstl et al. |
| 6,947,843 B2 | 9/2005 | Fisher et al. |
| 7,127,353 B2 | 10/2006 | Geiser |
| 7,383,133 B1 | 6/2008 | Scott |
| 7,460,436 B2 | 12/2008 | Segall et al. |
| 7,486,589 B2 | 2/2009 | Lee et al. |
| 7,869,954 B2 | 1/2011 | den Boer et al. |
| 2005/0006020 A1 | 1/2005 | Jose Zitha et al. |
| 2005/0190649 A1 | 9/2005 | Eisner et al. |
| 2006/0047431 A1 | 3/2006 | Geiser |
| 2006/0081412 A1 | 4/2006 | Wright et al. |
| 2006/0285438 A1 | 12/2006 | Arrowsmith et al. |
| 2007/0127313 A1 | 6/2007 | Segall et al. |
| 2007/0183260 A1 | 8/2007 | Lee et al. |
| 2007/0255500 A1 | 11/2007 | Pita et al. |
| 2007/0299614 A1 | 12/2007 | Dewarrat |
| 2008/0002523 A1 | 1/2008 | Podladchikov et al. |
| 2008/0004847 A1 | 1/2008 | Bradford |
| 2008/0021655 A1 | 1/2008 | Saenger |
| 2008/0021656 A1 | 1/2008 | Saenger |
| 2009/0010104 A1 | 1/2009 | Leaney |
| 2009/0048783 A1 | 2/2009 | Jechumtalova et al. |
| 2009/0059721 A1 | 3/2009 | Simon |
| 2009/0168599 A1 | 7/2009 | Suarez et al. |
| 2009/0248312 A1 | 10/2009 | Hsu et al. |
| 2009/0299637 A1 | 12/2009 | Dasgupta |
| 2011/0040536 A1 | 2/2011 | Levitan |
| 2011/0120718 A1* | 5/2011 | Craig .................. 166/308.1 |

OTHER PUBLICATIONS

Aki, K. (1966), "4. Generation and propagation of G waves from the Niigata earthquake of Jun. 4, 1964, Part 2: Estimation of earthquake moment, released energy and stress-strain drop from G wave spectrum," *Bulletin of the Earthquake Research Institute* 44, pp. 73-88.

Boatwright, J. et al. (1986), "Teleseismic estimates of the energy radiated by shallow earthquakes," *J. Geophys. Res.* 91, pp. 2095-2112.

Boler, F.M. et al. (1986), "Radiated seismic energy and strain energy release in laboratory dynamic tensile frature," *Pure Appl. Geophys.* 124, pp. 1420-9136.

Boore, D.M. et al. (1984), "Average body-wave radiation coefficients," *Bull. Seismol. Soc. Am.* 74, pp. 1615-1621.

Brune, J. (1970), "Tectonic stress and the spectra from seismic shear waves earthquakes," *J. Geophys. Res.* 75, pp. 4997-5009.

Dahlen, F.A. (1977), "The balance of energy in earthquake faulting," *Geophys. J. R. astr. Soc.* 48, pp. 239-261.

Hanks, T.C. (1977), "Earthquake stress drops, ambient tectonic stresses and stresses that derive plate motions," *Pure App. Geophys.* 115, pp. 441-458.

Hiramatsu, Y. et al. (2002), "Scaling law between corner frequency and seismic moment of microearthquakes: is the breakdown of the cube law a nature of earthquakes?" *Geophys. Res. Lett.* 29, pp. 52-1-52-4.

Ide, S. et al. (2003), "Apparent break in earthquake scaling due to path and site effects on deep borehole recordings," *J. Geophys. Res.* 108, pp. 16-1-16-13.

Imanishi, K. et al. (2004), "Source parameters and rupture velocities of microearthquakes in Western Nagano, Japan, determined using stopping phases," *Bull. Seismol. Soc. Am.* 94, pp. 1762-1780.

Jost, M.L. (1998), "Source parameters of injection-induced microearthquakes at 9km depth at the KTB deep drilling site, Germany," *Bull. Seismol. Soc., Am.* 88, pp. 815-832.

Kanamori, H. et al. (1975), "Theoretical basis of some empirical relations in seismology," *Bull. Seismol. Soc. Am.* 65, pp. 1073-1095.

Kanamori, H. et al. (1993), "Determination of earthquake energy release and ML using TERRAscope," Bull. Seismol. Soc. Am. 83, pp. 330-346.

Kanamori, H. (2001), "Energy budget of earthquakes and seismic efficiency," in Teisseyre, R., and Majewski, E., eds., Earthquake thermodynamics and phase transformations in the Earth's interior, New York, Academic Press, pp. 293-305.

Knopoff, L. (1958), "Energy release in earthquakes," Geophy. J. 1, pp. 44-52.

Kostrov, B. (1974), "Seismic moment and energy of earthquakes, and seismic flow of rock," Izv., Acad. Sci., USSR, Phys. Solid Earth (Engl. Transl.) 1, pp. 23-40.

Maxwell, S.C. et al. (2003), "Assessing the feasibility of reservoir monitoring using induced seismicity. 65$^{th}$ Conference and Exhibition," EAGE, expanded abstract.

McGarr, A. (1994), "Some comparisons between mining-induced and laboratory earthquakes," *Pure Appl. Geophys,* 142, pp. 467-489.

McGarr, A. (1999), "On relating apparent stress to the stress causing earthquake fault slip," *J. Geophys. Res.* 104, pp. 3003-3011.

Pavlis, G.L. (1986), "Appraising earthquake hypocenter location errors: a complete, practical approach for single-event locations," *Bull. Seismol. Soc. Am.* 76, pp. 1699-1717.

Richardson, E. et al. (2002), "Seismicity in deep gold mines of South Africa: implications for tectonic earthquakes," *Bull. Seismol. Soc. Am.* 92, pp. 1766-1782.

Savage, J.C. et al. (1978), "Gravitational energy and faulting," *Bull. Seismol. Soc. Am.* 68, pp. 1613-1622.

Somerville, P.G. et al. (1987), "Comparison of source scaling relations of eastern and western North American earthquakes," *Bull. Seismol. Soc. Am.* 77, pp. 322-346.

Venkataraman, A. et al. (2002), "Observational constraints on the fracture energy of subduction zone earthquakes," *J. Geophys. Res.* 109, pp. 20 pgs.

von Seggern, D.H., 1976. Seismic threshold determination, Bull. Seismol. Soc. Am., 66, 753-788.

von Seggern, D.H., 2004. Seismic background noise and detection threshold in the Southern Great Basin Digital Seismic Network, Bull. Seismol. Soc. Am, 94, 2280-2298.

Wessels, S.A. et al. (2011), "Identifying faults and fractures in unconventional reservoirs through microseismic monitoring," *first break* 29, pp. 99-104.

Willis, M.E. (2008), "Evaluatign Hydraulic Fracturing Success in Tight Gas Formations: A Seismic View," Earth Resources Laboratory, Massachusetts Institute of Technology, 7 pgs.

Yamada, T. et al. (2005), "Radiation efficiency and apparent stress of small earthquakes in a South African gold mine," *J. Geophy. Res.* 110, 18 pgs.

International Search Report & Written Opinion, dated Jul. 31, 2012, PCT/US2012/35317.

* cited by examiner

ESTIMATING FRACTURE DIMENSIONS FROM MICROSEISMIC DATA

CROSS-REFERENCE TO RELATED APPLICATION

This application is the National Stage entry under 35 U.S.C. 371 of PCT/US2012/035317 that published as WO 2013/028237 and was filed on Apr. 27 2012, which claims the benefit of U.S. Provisional Application No. 61/526,536, filed Aug. 23 2011, entitled ESTIMATING FRACTURE DIMENSIONS FROM MICROSEISMIC DATA, the entirety of which is incorporated by reference herein.

FIELD OF THE INVENTION

The invention relates generally to the field of geophysical prospecting and, more particularly, to seismic data processing. Specifically, the invention is a method for estimating fracture dimensions from microseismic data.

BACKGROUND OF THE INVENTION

To enhance the permeability of reservoir rock, hydraulic fractures are stimulated by injecting fluid and proppant into the rock matrix. The resultant stress perturbation induces microseismicity in the formation, which can be recorded by properly positioned geophones. Microseismic data may be acquired during hydro-fracture treatments to validate and assist completions; specifically, engineers would like to use the data to (a) determine the dimensions of the failure and its relation to hydraulic fracture treatment data, and (b) determine the interaction between perforation stages so as to optimize perforation spacing. Additionally, engineers would like to use the data to assist in landing wells in the formation and to illuminate faults and potential fault re-activation.

Hydraulic fracture modeling is used to determine the volumes and rates of fluid injected into the subsurface. The models use best estimates of elastic parameters of the rock, and calculate the volume and rate of fluid and proppant to be injected to create a fracture of certain dimensions. Microseismic monitoring is one of the few methods that allow us to determine the actual volume of rock that was fractured.

Current methods of analyzing microseismic data use magnitude (a compressed dynamic range) to represent microseismic event size. These methods do not distinguish between microseismic events that are related to the hydrofracture and events triggered on nearby faults for purposes of calculating fracture dimensions. Values assigned to fracture dimensions (used in Stimulated Rock Volume calculations) are based on arbitrary shapes drawn around all detected microseismicity. Even when the full dynamic scale (usually dynamic amplitude) is used to quantify the event size, this measure is not used in quantifying fracture height growth and wing length. This results in a gross over-estimation of fracture dimensions and poor use of microseismic data.

In an article by Wessels et al. ("Identifying faults and fractures in unconventional reservoirs through microseismic monitoring," *First Break* 29, 99-104 (2011)), the authors describe how in microseismic monitoring of low permeability reservoirs, the use of source mechanism inversion, b values, and energy release rates enables identification and differentiation between fracture stimulation and fault activation, critical issues for effective hydraulic treatment. This paper uses the energy of microseismic events to distinguish between events that are related to stimulated fractures from events that are triggered on a pre-existing tectonic fault. Fracture dimensions are not discussed.

U.S. Patent Application Publication No. 2009/0299637 ("Continuous Reservoir Monitoring for Fluid Pathways Using Microseismic Data," S. N. Dasgupta; see claim 7) discloses a method in which the computer compares the detected pathways for preferential fluid movement in the reservoir with predetermined computational models of the pathways. The dimensions of the fracture are not computed. In U.S. Pat. No. 6,947,843, to Fisher et al. ("Microseismic signal processing"), the dominant source frequency is used to determine the radius of the fracture plane, the polarity of the waveforms to determine the orientation of the fracture plane, and waveform similarity and proximity of events to define hydraulically connected volumes. The objective of finding the hydraulically stimulated volume is the same, but the approach is very different from the present inventive method. U.S. Pat. No. 7,460,436 to Segall and Sang-Ho ("Apparatus and method for hydraulic fracture imaging by joint inversion of deformation and seismicity") discloses a method to image hydraulic fractures by using ground deformation and seismicity data and minimizing weighted sums of the differences between observed and predicted values of the two measurements. The present inventive method does not use ground deformation and is not model based. The method presented in "Evaluating Hydraulic Fracturing Success in Tight Gas Formations: A Seismic view," by Mark Willis, pp. 1-7, downloaded from http://www.seismicmicro-.com/PDF/ willis_hydraulic_fracturing_wp_smtwc052108.pdf, uses a combination of scattered energy and VSP data to image and characterize fractures. The present inventive method does not use the energy scattered from the fractures.

In summary, current methods of estimating hydraulic fracture dimensions are either model based or based on datasets where all the microseismic events, regardless of event size and/or recording bias, are used. In contrast, the present invention is a data-based method of calculating hydraulic fracture dimensions using a systematic approach to select microseismic events from all the recorded events. The method also minimizes the effect of recording bias on the estimates.

SUMMARY OF THE INVENTION

In a general embodiment, the present invention is a computer-implemented method for hydraulic fracture imaging using microseismic events caused by stimulation of the fracture at a perforation location, said method comprising using a computer to determine fracture dimensions from calculated cumulative seismic energy or cumulative seismic moment of the microseismic events.

In a more specific embodiment, the inventive method comprises: (a) obtaining microseismic data representing the fracture stimulation; (b) locating the microseismic events in the microseismic data, and determining their magnitudes; (c) calculating seismic energy or seismic moment of the microseismic events from their magnitudes; (d) plotting or otherwise displaying the microseismic events, where size of each microseismic event is scaled to be proportional to the calculated energy or moment; (e) calculating cumulative seismic energy or moment as a function of distance from the perforation location, as shown on the plot or display; and (f) determining one or more fracture dimensions from the calculated cumulative seismic energy or moment as a function of distance.

BRIEF DESCRIPTION OF THE DRAWINGS

The present invention and its advantages will be better understood by referring to the following detailed description and the attached drawings in which:

Because of patent law restrictions on use of color, FIG. 2 is a black and white reproduction of an original colored data display.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it must be, at least for the most part, performed on a computer, typically a suitably programmed digital computer. In some embodiments, the invention is completely automated.

DETAILED DESCRIPTION OF EXAMPLE EMBODIMENTS

Figure 1:
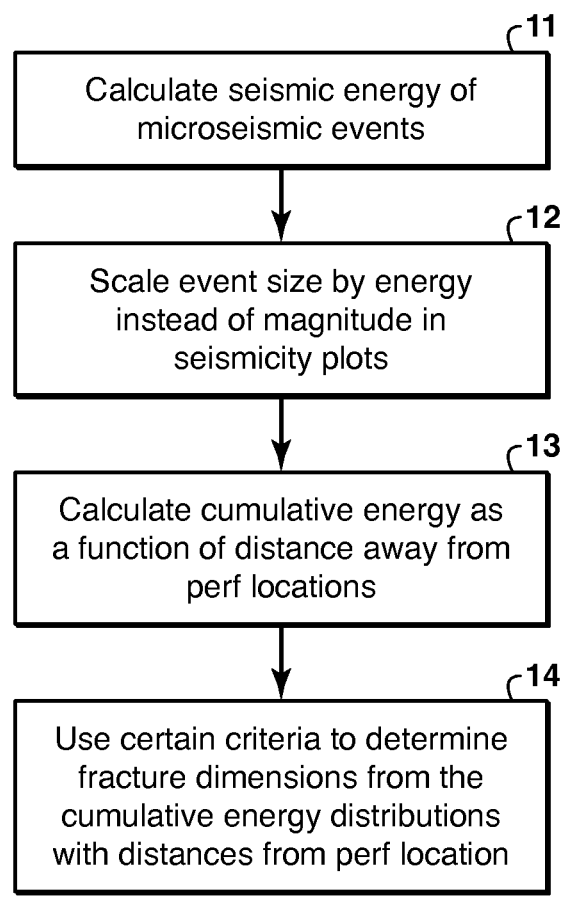
FIG. 1 is a flowchart showing basic steps in one embodiment of the present inventive method.

The present invention is a simple approach to analyzing microseismic data that allows robust estimates of fracture dimensions. In this method, advantage is taken of the dynamic range of the detected microseismicity and event size is quantified. The quantifying may be done in terms of seismic energy or seismic moment rather than event magnitude. (Seismic moment is a measure of the size of an earthquake and is proportional to the product of the area of fault rupture and the average amount of fault slip, and can be calculated from the amplitude spectra of seismic waves generated by an earthquake.) FIG. 1 is a flowchart showing basic steps in one embodiment of the present inventive method that is used herein as an example of the invention.

In step 11, the seismic energy or seismic moment of microseismic events is calculated. Seismic energy can be calculated for the microseismic events in the time or frequency domain from the appropriately corrected seismic waveforms recorded by the geophones. See, for example, Boatwright, J. and G. Choy, "Teleseismic estimates of the energy radiated by shallow earthquakes," *J. Geophys. Res.* 91, 2095-2112 (1986); or Venkataraman et al., "Radiated Energy from the 16 Oct. 1999 Hector Mine Earthquake: Regional and Teleseismic Estimates," *Bulletin of the Seismological Society of America* 92, 1256-1265 (2002)—DOI: 10.1785/0120000929. Seismic moment may be calculated as explained, for example, by Keiiti Aki in "4. Generation and propagation of G waves from the Niigata earthquake of Jun. 14, 1964, Part 2: Estimation of earthquake moment, released energy and stress-strain drop from G wave spectrum," *Bulletin of the Earthquake Research Institute* 44, 73-88 (1966); download from:
   http://www.iris.edu/seismo/quakes/1964niigata/Aki1966b.pdf.

If a seismic event catalog or earthquake table is available, i.e. has been compiled covering the time period of the fracture treatment, the seismic energy can alternatively be calculated from the listed event magnitude. Seismic magnitude ($M_W$) from event catalogs can be used to determine seismic energy ($E_R$), in ergs, using the following formula (Kanamori, "The energy release in great earthquakes," *J. Geophys. Res.* 82, 2981-2987 (1977)):

$$\log E_R = 1.5 * M_W + 11.8$$

Alternately, seismic moment can be used for the analysis where seismic moment ($M_O$) in dyne-cm is given as $$\log M_O = 1.5 * (M_W + 10.73).$$

Though determining the magnitude of microearthquakes is a difficult problem fraught with uncertainties, the actual magnitude values will not affect the analysis as long as a consistent approach is used to calculate event magnitudes, because the method needs only relative event magnitudes.

Figure 2:
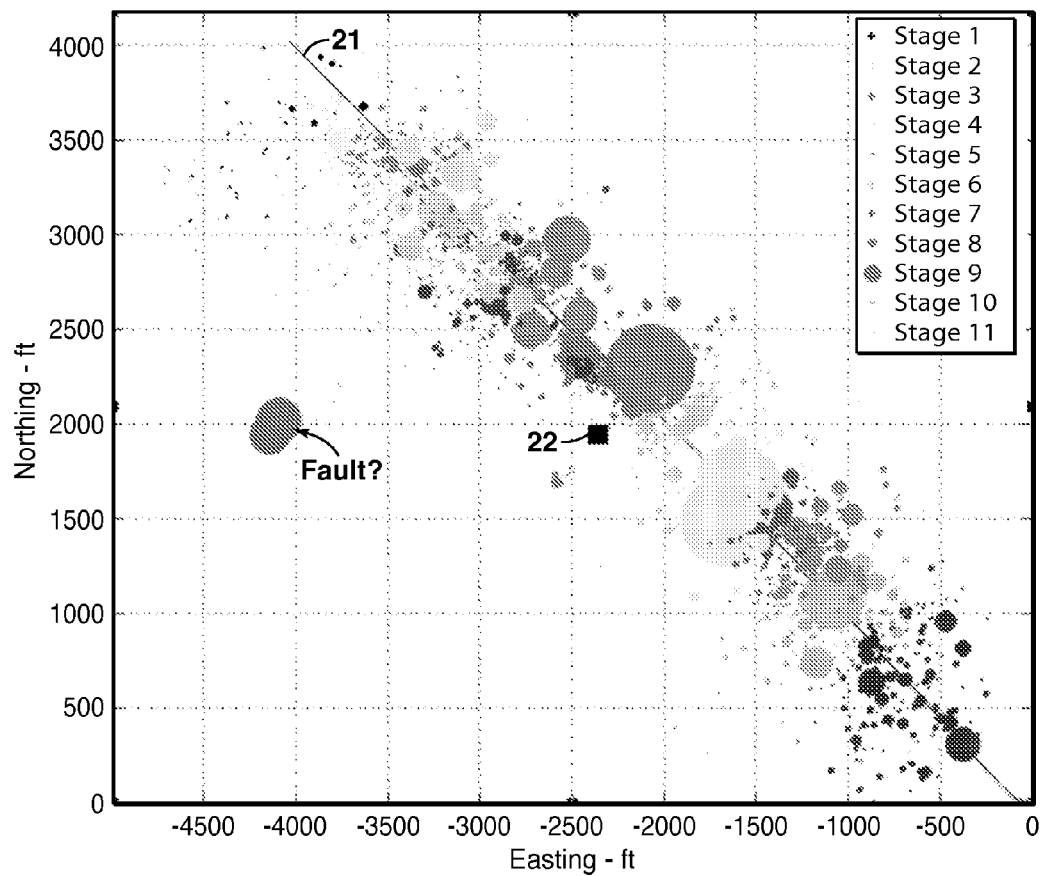
FIG. 2 is a map view of microseismic events where circles represent the microseismic events with size scaled to energy in accordance with the present inventive method.

In step 12, the seismic energy or seismic moment, not the magnitude (seismic amplitude) as in previous methods, may be used to visualize the seismicity distribution. This may be done by scaling event size by energy or moment instead of magnitude in seismicity plots. When seismic event size is scaled to seismic energy or moment instead of magnitude, the full dynamic range of the event distribution is exploited. Seismic magnitude is calculated from the amplitude of the seismic waves at the earthquake source. It is a measure of the size of an earthquake, and it provides an indication of the energy of the earthquake, except that it has a compressed dynamic range because the magnitude scale is logarithmic. For the present invention, it does not matter whether a Richter scale is used or some other scale is used, as long as it is a robust measure for the size range of earthquakes in the dataset at hand, and as long as a consistent approach is used to calculate the magnitude for all the earthquakes in a given dataset. Scaling seismic event size to seismic energy or moment enables visualization of events such that it is easier to delineate fault activation, which typically shows larger events and lower b-values, where b-values are the slopes of straight lines that are fit to the Gutenberg-Richter magnitude-frequency relationship for earthquakes. This relationship is given by:

$$\log(N(M)) = a - bM,$$

where N(M) is the number of earthquakes of magnitude $\geq M$, a is a constant and b determines the relative number of earthquakes of different magnitudes. Such scaling also allows for a qualitative estimate of effective fracture dimensions. As shown in FIG. 2, plotting seismicity such that the size of the circle is scaled to seismic energy (seismic moment could have been used instead) results in a clearer depiction of the variation in contribution of different events to the total energy released. The events to the far left are large, disconnected from the hydrofracture branches and located about 1000 ft away from the frac wellbore 21. This plot suggests that these events are not directly related to the hydro-frac, but are related to the re-activation of a fault. 22 is the monitoring well, which has the 3-component geophones that record the microseismic events. FIG. 2 is a black-and-white reproduction of a data display where color was used to represent the different stages (in time) of a hydrofracture treatment.

Figure 3:
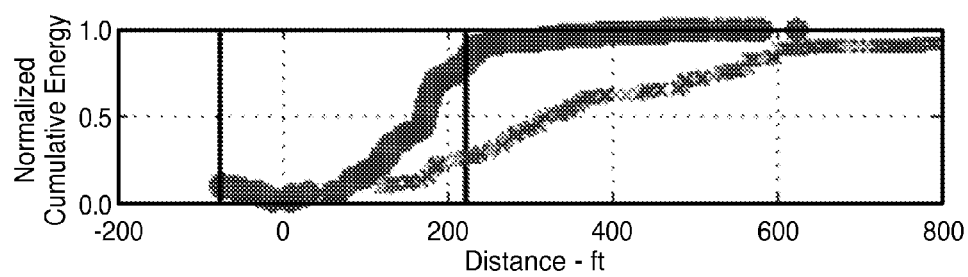
FIG. 3 shows the normalized cumulative energy as a function of vertical distance (circle) and in-plane distance (cross) from perf, for one stage of a hydrofracture treatment.

In step 13, the cumulative energy (or cumulative moment) is calculated as a function of distance away from perf (perforation) location. Distance from perf can be calculated in a way that best suits the problem. The cumulative energy as a function of distance from the perf location shows the build-up of energy (or moment) released in events as distance away from the perf is increased. The cumulative seismic energy as a function of distance from the perf location can be calculated in all directions using information from FIG. 2, or a 3-D version of FIG. 2. The three directions of interest here are typically along the lateral extent to estimate frac wing length, along the vertical extent to determine fracture height growth, and along the hydrofrac (i.e., line 21 in FIG. 2) to determine fracture width. In FIG. 3, the normalized cumulative energy (alternatively, cumulative moment could be used) as a function of vertical distance (circle) and in-plane distance (cross) from perf is shown for one stage of a hydrofracture treatment. The height growth can be determined from the vertical distance cut-offs, and the wing length can be determined from the in-plane distance cut-offs.

In step 14, cut-offs (can vary depending on the region) may be used to determine the fracture dimensions, for example fracture height growth and wing length, where wing length is a measure of horizontal extent of the fracture in a direction perpendicular to the fracture well 21. Various criteria can be used to decide on cut-offs to be applied to the cumulative energy release with distance from the perf location. These criteria may vary from one field to another, but the basic premise can be that the cumulative energy does not increase significantly beyond a certain distance from the perf location. This distance will be a measure of fracture dimension. Additional criteria can be used to distinguish seismicity related to the main hydro-frac treatment from seismicity that may be related to triggering on an adjacent fault. In FIG. 3, it can be seen that the vertical distance cut-off is about 220 feet, and the horizontal distance cut-off is about 600 feet.

One of the criteria that can be used to determine the fracture dimension is based on the percentage of cumulative energy accumulated. For example, the fracture dimension of 220 ft shown in FIG. 3 is the distance at which 85% of the total energy for a given stage is released. This criterion can be set to include limits such as distance between successive events, etc.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for hydraulic fracturing with microseismic monitoring of a hydraulic fracture caused by stimulation of the fracture by fluid injection at a perforation location, said method comprising:
   obtaining microseismic data representing the fracture stimulation;
   locating the microseismic events in the microseismic data, and determining their magnitudes;
   using a computer to transform seismic data, comprising said microseismic events, into a model of the subsurface showing fracture dimensions caused by the fluid injection, wherein the computer performs steps of,
   calculating seismic energy or seismic moment of the microseismic events from their magnitudes,
   calculating cumulative seismic energy or moment as a function of distance from the perforation location, and
   determining one or more fracture dimensions from the calculated cumulative seismic energy or moment as a function of distance, wherein the determining includes selecting a cutoff criterion and applying the cutoff criterion to the calculated cumulative seismic energy or moment as a function of distance, and the selected cutoff criterion is a selected percentage of maximum calculated cumulative seismic energy or moment; and
   injecting fluid into the fracture until the fracture dimensions meet or exceed predetermined dimensions.

2. The method of claim 1, wherein a plot or display of the microseismic events shows their location relative to the perforation location.

3. The method of claim 2, wherein the plot or display is made such that microseismic events may be distinguished according to which stage of the fracture stimulation they occur in.

4. The method of claim 1, wherein the cutoff criterion is selected so that the cumulative seismic energy or moment does not increase by more than a significant amount beyond a certain distance from the perf location, and this certain distance is the one or more fracture dimensions.

5. The method of claim 4, wherein the certain distance is where a predetermined percentage of the cumulative seismic energy or moment has been released.

6. The method of claim 1, further comprising plotting or otherwise displaying the microseismic events, where size of each event is scaled to be proportional to the calculated energy or moment;
   wherein the plot or display is used for quality control of distribution of the seismic energy, or for determining whether a microseismic event was caused by the stimulation of the fracture at the perforation location, or for selecting the cutoff criterion.

7. The method of claim 1, wherein the magnitude of the microseismic events are determined from an earthquake table or calculated from measured waveforms of the microseismic events.

8. The method of claim 1, wherein the micro seismic data are obtained from a seismic survey using a borehole configuration or a surface configuration or any combination thereof.

9. The method of claim 1, wherein the cumulative seismic energy or moment is calculated as a function of distance from the perforation location in at least one of three directions consisting of along fracture direction, lateral to fracture direction and vertical.

10. The method of claim 1, wherein the one or more fracture dimensions comprise length, width, and height of the fracture.

* * * * *